US012598584B2

(12) United States Patent
Hong et al.

(10) Patent No.: US 12,598,584 B2
(45) Date of Patent: Apr. 7, 2026

(54) PAGING PROCESSING METHOD, COMMUNICATION APPARATUS, AND STORAGE MEDIUM

(71) Applicant: BEIJING XIAOMI MOBILE SOFTWARE CO., LTD., Beijing (CN)

(72) Inventors: Wei Hong, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 312 days.

(21) Appl. No.: 18/540,834

(22) Filed: Dec. 14, 2023

(65) Prior Publication Data

US 2024/0114483 A1 Apr. 4, 2024

Related U.S. Application Data

(63) Continuation of application No. PCT/CN2021/101652, filed on Jun. 22, 2021.

(51) Int. Cl.
*H04W 68/02* (2009.01)
*H04W 88/06* (2009.01)

(52) U.S. Cl.
CPC ............ *H04W 68/02* (2013.01); *H04W 88/06* (2013.01)

(58) Field of Classification Search
CPC ..... H04W 68/00; H04W 68/02; H04W 68/12; H04W 88/00; H04W 88/06; H04W 8/18; H04W 8/183; H04W 8/186; H04W 8/20; H04W 8/205
See application file for complete search history.

(56) References Cited

U.S. PATENT DOCUMENTS

| | | | |
|---|---|---|---|
| 2014/0364118 A1 | 12/2014 | Belghoul et al. | |
| 2022/0264506 A1* | 8/2022 | Kiss | H04W 68/02 |
| 2024/0080804 A1* | 3/2024 | Gurumoorthy | H04W 68/12 |

(Continued)

FOREIGN PATENT DOCUMENTS

| | | |
|---|---|---|
| CN | 102573065 A | 7/2012 |
| CN | 111278107 A | 6/2020 |
| CN | 112425225 A | 2/2021 |

(Continued)

OTHER PUBLICATIONS

International Search Report of PCT/CN2021/101652 dated Dec. 29, 2021 with English translation.

(Continued)

*Primary Examiner* — Siu M Lee
(74) *Attorney, Agent, or Firm* — Arch & Lake LLP

(57) ABSTRACT

Provided in the present application are a paging processing method and apparatus, and a storage medium. The paging processing method is applied to a multi-card terminal device, and the method includes: in response to that a second subscriber identity card in an idle state in the multi-card terminal device receives a paging message sent from a second network device, sending, by a first subscriber identity card in a connected state in the multi-card terminal device, first busy indication information to a first core network device. The first busy indication information is used to indicate that the multi-card terminal device has received the paging message of the second network device and decided not to respond temporarily.

20 Claims, 3 Drawing Sheets

In response to that a second subscriber identity card in an idle state in the multi-card terminal device receives a paging message sent from a second network device, determine whether it is needed to respond to the paging message of the second network device according to a preset criterion — 301

In response to that the multi-card terminal device decides not to respond to the paging message of the second network device, send, by the second subscriber identity card, second busy indication information to the first subscriber identity card, where the second busy indication information is used to indicate that the second subscriber identity card has received the paging message of the second network device and decided not to respond temporarily — 302

After receiving the second busy indication information, send, by the first subscriber identity card, the first busy indication information to the first core network device, where the first busy indication information is used to indicate that the multi-card terminal device has received the paging message of the second network device and decided not to respond temporarily — 303

(56) References Cited

U.S. PATENT DOCUMENTS

2024/0089889 A1*  3/2024  Yamamoto .......... H04W 68/005

FOREIGN PATENT DOCUMENTS

| | | | |
|---|---|---|---|
| CN | 112514472 A | 3/2021 | |
| CN | 112929964 A | 6/2021 | |
| EP | 3764717 A2 | 1/2021 | |
| WO | 2013009549 A1 | 1/2013 | |
| WO | 2020247043 A1 | 12/2020 | |
| WO | 2021113581 A1 | 6/2021 | |
| WO | WO-2023014166 A1 * | 2/2023 | .............. H04W 8/18 |

OTHER PUBLICATIONS

Sony, "Solution: Busy Indication as a paging response", SA WG2 Meeting #135, S2-1909466, Oct. 14-18, 2019, Split, KR, (5p).
The Supplementary European Search Report issued in Application No. 21946363.5 dated Jul. 24, 2024, (11p).

* cited by examiner

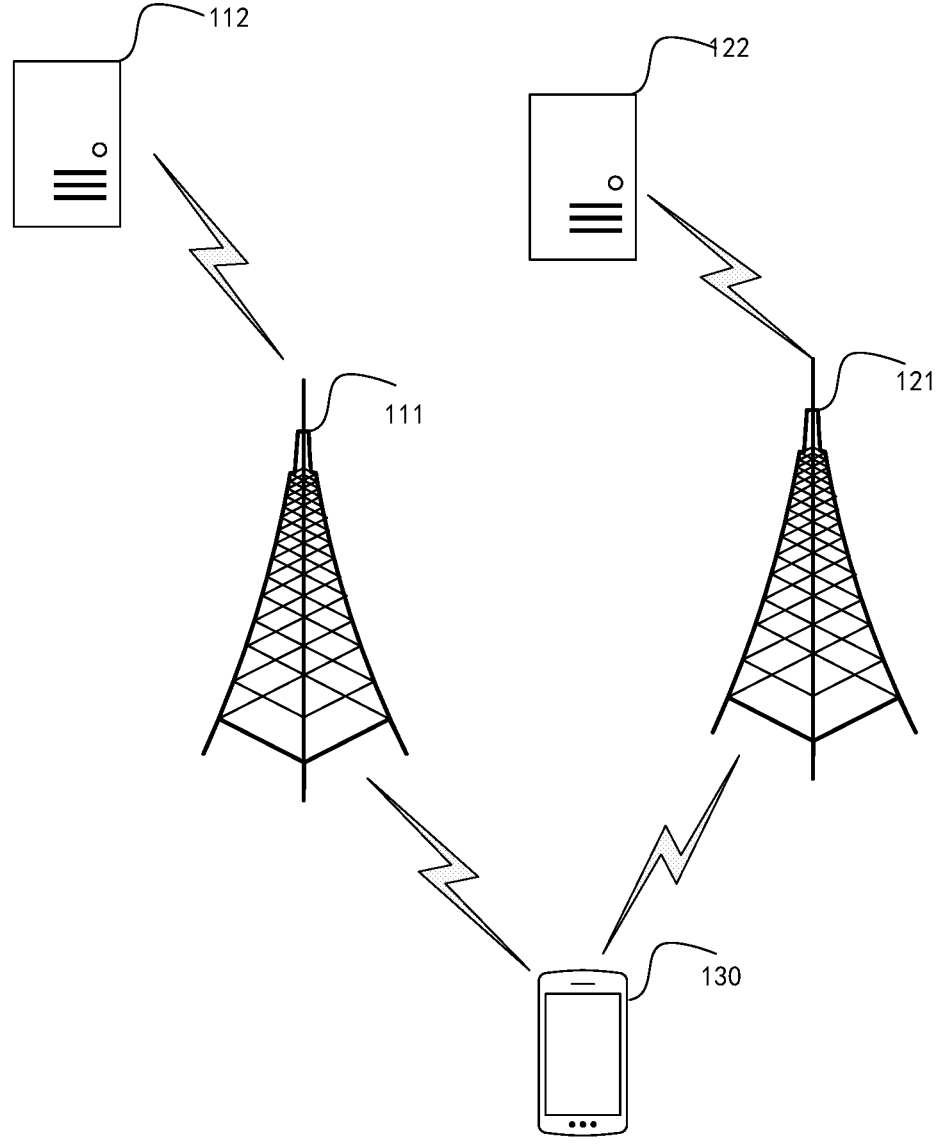

FIG. 1

In response to that a second subscriber identity card in an idle state in the multi-card terminal device receives a paging message sent from a second network device, send, by a first subscriber identity card in a connected state in the multi-card terminal device, first busy indication information to a first core network device; where the first busy indication information is used to indicate that the multi-card terminal device has received the paging message of the second network device and decided not to respond temporarily

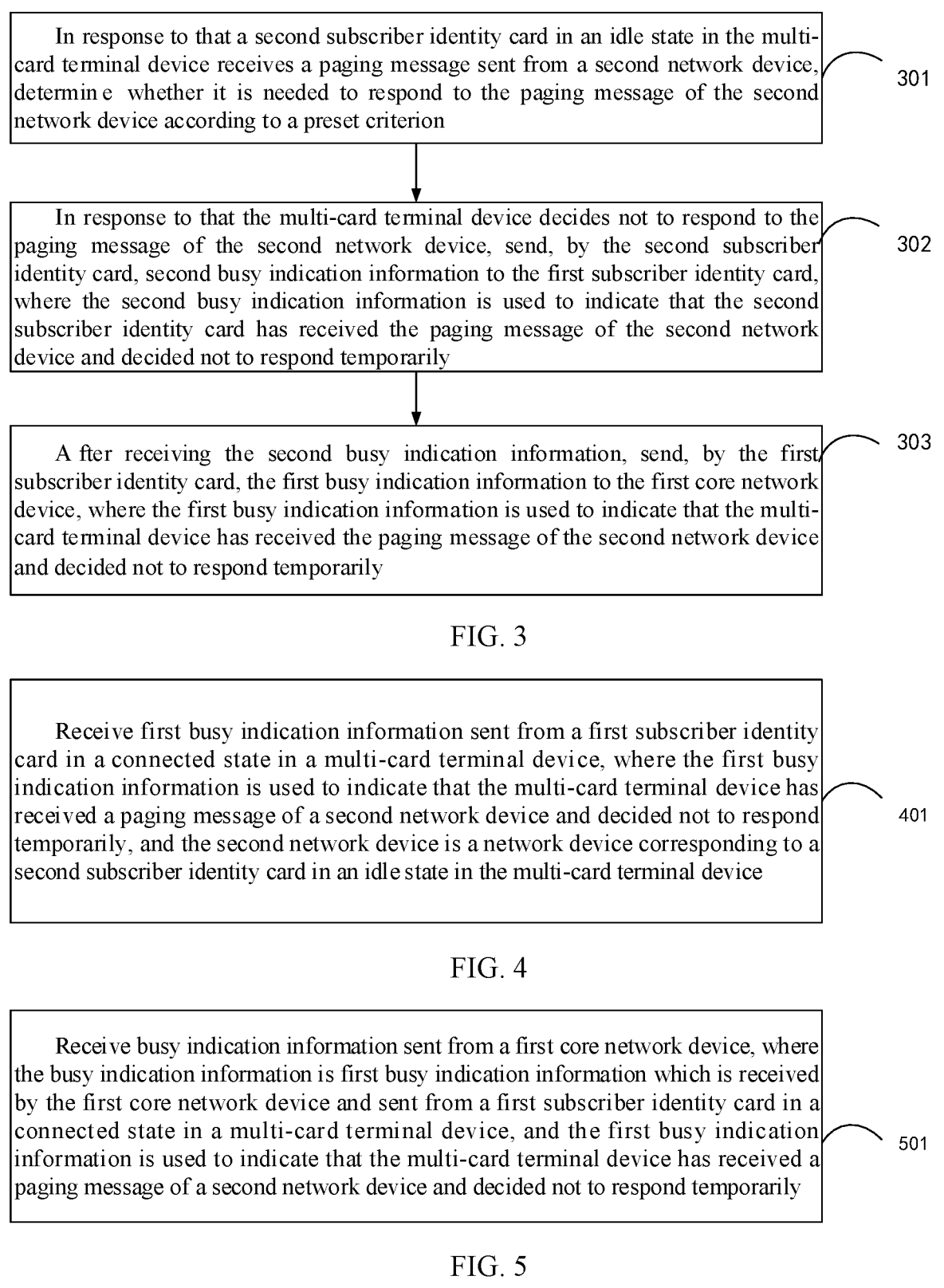

In response to that a second subscriber identity card in an idle state in the multi-card terminal device receives a paging message sent from a second network device, determine whether it is needed to respond to the paging message of the second network device according to a preset criterion — 301

In response to that the multi-card terminal device decides not to respond to the paging message of the second network device, send, by the second subscriber identity card, second busy indication information to the first subscriber identity card, where the second busy indication information is used to indicate that the second subscriber identity card has received the paging message of the second network device and decided not to respond temporarily — 302

After receiving the second busy indication information, send, by the first subscriber identity card, the first busy indication information to the first core network device, where the first busy indication information is used to indicate that the multi-card terminal device has received the paging message of the second network device and decided not to respond temporarily — 303

FIG. 3

Receive first busy indication information sent from a first subscriber identity card in a connected state in a multi-card terminal device, where the first busy indication information is used to indicate that the multi-card terminal device has received a paging message of a second network device and decided not to respond temporarily, and the second network device is a network device corresponding to a second subscriber identity card in an idle state in the multi-card terminal device — 401

FIG. 4

Receive busy indication information sent from a first core network device, where the busy indication information is first busy indication information which is received by the first core network device and sent from a first subscriber identity card in a connected state in a multi-card terminal device, and the first busy indication information is used to indicate that the multi-card terminal device has received a paging message of a second network device and decided not to respond temporarily — 501

FIG. 5

PAGING PROCESSING METHOD, COMMUNICATION APPARATUS, AND STORAGE MEDIUM

CROSS-REFERENCE TO RELATED APPLICATIONS

This application is a continuation application of International Application No. PCT/CN2021/101652, filed Jun. 22, 2021, the entire disclosure of which is incorporated herein by reference for all purposes.

TECHNICAL FIELD

The present disclosure relates to the field of communication technologies, and in particular, to a paging processing method, a paging processing apparatus, a communication apparatus and a storage medium.

BACKGROUND

With the developments of wireless communication technologies, there are more and more multi-card terminal devices on the market. Currently, processing methods for multi-card terminal devices are mainly based on implementations of various terminal manufacturers, which leads to many different terminal behaviors and processing methods (such as dual-card single-standby, dual-card dual-standby single-pass, dual-card dual-standby dual-pass, and so on) and may cause some problems. For example, when a multi-card terminal device conducts communications with a first system, it needs to intermittently detect a second system, such as monitoring paging, performing measurements, reading system information, and so on. This may have an impact on the performance of the first system. If these operations are not performed with the second system, for example, paging is not monitored, a service of the second system cannot be established all the time. When the multi-card terminal device receives a paging message on the second system, if the multi-card terminal device does not respond to the paging message of the second system all the time, the second system will continue to page the multi-card terminal device until reaching a maximum number of times. This not only wastes signaling resources, but also may trigger erroneous statistics or operations of the second system.

SUMMARY

Embodiments of the present disclosure provides a paging processing method, a paging processing apparatus, a communication apparatus and a storage medium, which can be applied in a Long Term Evolution (LTE) system, a 5G/NR (New Radio) system and can avoid wastes of signaling resources and erroneous statistics or operations of the second system.

In a first aspect, the present disclosure provides a paging processing method, applied to a multi-card terminal device. The method includes:

in response to that a second subscriber identity card in an idle state in the multi-card terminal device receives a paging message sent from a second network device, sending, by a first subscriber identity card in a connected state in the multi-card terminal device, first busy indication information to a first core network device; where the first busy indication information is used to indicate that the multi-card terminal device has received the paging message of the second network device and decided not to respond temporarily.

In a second aspect, the present disclosure provides a paging processing method applied to a first core network device. The method includes:

receiving first busy indication information sent from a first subscriber identity card in a connected state in a multi-card terminal device;

where the first busy indication information is used to indicate that the multi-card terminal device has received a paging message of a second network device and decided not to respond temporarily, and the second network device is a network device corresponding to a second subscriber identity card in an idle state in the multi-card terminal device.

In a third aspect, the present disclosure provides a paging processing method applied to a second core network device. The method includes:

receiving busy indication information sent from a first core network device, where the busy indication information is first busy indication information which is received by the first core network device and sent from a first subscriber identity card in a connected state in a multi-card terminal device;

where the first busy indication information is used to indicate that the multi-card terminal device has received a paging message of a second network device and decided not to respond temporarily, and the second network device is a network device corresponding to a second subscriber identity card in an idle state in the multi-card terminal device.

In an implementation, after receiving the busy indication information sent from the first core network device, the method further includes:

notifying, through an interface between a core network device and a network device, the second network device to suspend paging to the second subscriber identity card; or, suspending paging to the second subscriber identity card; or, suspending paging to the second subscriber identity card based on the first busy indication information.

In a fourth aspect, the present disclosure provides a paging processing apparatus. The apparatus has a part or all of the functions of a multi-card terminal device implementing the method(s) described in the first aspect. For example, the functions of the paging processing apparatus may have functions in a part or all of the embodiments of the present disclosure, or may have a function of independently implementing any one of the embodiments of the present disclosure. The functions may be implemented by hardware, or may be implemented by hardware executing corresponding software. The hardware or software includes one or more units or modules corresponding to the above functions.

In a fifth aspect, the present disclosure provides another paging processing apparatus. The paging processing apparatus has a part or all of the functions of the first core network device implementing the method examples described in the second aspect. For example, the functions of the paging processing apparatus may have the functions of a part or all of embodiments of the present disclosure, or may have a function of independently implementing any one of embodiments of the present disclosure. The functions may be implemented by hardware, or may be implemented by hardware executing corresponding software. The hardware or software includes one or more units or modules corresponding to the above functions.

In an implementation, the structure of the paging processing apparatus may include a transceiving module and a processing module. The processing module is configured to support the paging processing apparatus to perform corresponding functions in the above methods. The transceiving module is configured to support communication(s) between the paging processing apparatus and other device(s). The paging processing apparatus may further include a storage module. The storage module is configured to couple with the transceiving module and the processing module, and stores necessary computer programs and data for the paging processing apparatus.

As an example, the processing module may be a processor, the transceiving module may be a transceiver or a communication interface, and the storage module may be a memory.

In a sixth aspect, the present disclosure provides yet another paging processing apparatus. The paging processing apparatus has a part or all of the functions of the second core network device implementing the method examples described in the second aspect. For example, the functions of the paging processing apparatus may have the functions of a part or all of embodiments of the present disclosure, or may have a function of independently implementing any one of embodiments of the present disclosure. The functions may be implemented by hardware, or may be implemented by hardware executing corresponding software. The hardware or software includes one or more units or modules corresponding to the above functions.

In an implementation, the structure of the paging processing apparatus may include a transceiving module and a processing module. The processing module is configured to support the paging processing apparatus to perform corresponding functions in the above methods. The transceiving module is configured to support communication(s) between the paging processing apparatus and other device(s). The paging processing apparatus may further include a storage module. The storage module is configured to couple with the transceiving module and the processing module, and stores necessary computer programs and data for the paging processing apparatus.

As an example, the processing module may be a processor, the transceiving module may be a transceiver or a communication interface, and the storage module may be a memory.

In a seventh aspect, the present disclosure provides a communication apparatus. The communication apparatus includes a processor. When the processor calls a computer program in a memory, the method(s) described in the first aspect is(are) implemented.

In an eighth aspect, the present disclosure provides a communication apparatus. The communication apparatus includes a processor. When the processor calls a computer program in a memory, the method(s) described in the second aspect is(are) implemented.

In a ninth aspect, the present disclosure provides a communication apparatus. The communication apparatus includes a processor. When the processor calls a computer program in a memory, the method(s) described in the third aspect is(are) implemented.

In a tenth aspect, the present disclosure provides a communication apparatus. The communication apparatus includes a processor and a memory, and a computer program is stored in the memory; the processor executes the computer program stored in the memory, to cause the communication apparatus to implement the method(s) described in the first aspect.

In an eleventh aspect, the present disclosure provides a communication apparatus. The communication apparatus includes a processor and a memory, and a computer program is stored in the memory; the processor executes the computer program stored in the memory, to cause the communication apparatus to implement the method(s) described in the second aspect.

In a twelfth aspect, the present disclosure provides a communication apparatus. The communication apparatus includes a processor and a memory, and a computer program is stored in the memory; the processor executes the computer program stored in the memory, to cause the communication apparatus to implement the method(s) described in the third aspect.

In a thirteenth aspect, the present disclosure provides a communication apparatus. The communication apparatus includes a processor and an interface circuit. The interface circuit is configured to receive code instructions and transmit them to the processor. The processor is configured to run the code instructions to cause the communication apparatus to implement the method(s) described in the first aspect.

In a fourteenth aspect, the present disclosure provides a communication apparatus. The communication apparatus includes a processor and an interface circuit. The interface circuit is configured to receive code instructions and transmit them to the processor. The processor is configured to run the code instructions to cause the communication apparatus to implement the method(s) described in the second aspect.

In a fifteenth aspect, the present disclosure provides a communication apparatus. The communication apparatus includes a processor and an interface circuit. The interface circuit is configured to receive code instructions and transmit them to the processor. The processor is configured to run the code instructions to cause the communication apparatus to implement the method(s) described in the third aspect.

In a sixteenth aspect, the present disclosure provides a communication system, which includes the paging processing apparatus described in the fourth aspect, the paging processing apparatus described in the fifth aspect, and the paging processing apparatus described in the sixth aspect; or, the system includes the communication apparatus described in the seventh aspect, the communication apparatus described in the eighth aspect, and the communication apparatus described in the ninth aspect; or, the system includes the communication apparatus described in the tenth aspect, the communication apparatus described in the eleventh aspect, and the communication apparatus described in the twelfth aspect; or, the system includes the communication apparatus described in the thirteenth aspect, the communication apparatus described in the fourteenth aspect, and the communication apparatus described in the fifteenth aspect.

In a seventeenth aspect, the present disclosure provides a non-transitory computer-readable storage medium configured to store instructions used by the above-mentioned communication apparatus. When the instructions are executed, the communication apparatus is caused to implement the method(s) described in the first aspect.

In an eighteenth aspect, the present disclosure provides a non-transitory computer-readable storage medium configured to store instructions used by the above-mentioned communication apparatus. When the instructions are executed, the communication apparatus is caused to implement the method(s) described in the second aspect.

In a nineteenth aspect, the present disclosure provides a non-transitory computer-readable storage medium configured to store instructions used by the above-mentioned communication apparatus. When the instructions are executed, the communication apparatus is caused to implement the method(s) described in the third aspect.

In a twentieth aspect, the present disclosure further provides a computer program product including a computer program. When the computer program product runs on a computer, the computer is caused to implement the qjmethod(s) described in the first aspect.

In a twenty-first aspect, the present disclosure further provides a computer program product including a computer program. When the computer program product runs on a computer, the computer is caused to implement the qjmethod(s) described in the second aspect.

In a twenty-second aspect, the present disclosure further provides a computer program product including a computer program. When the computer program product runs on a computer, the computer is caused to implement the method(s) described in the third aspect.

In a twenty-third aspect, the present disclosure provides a computer program that, when runs on a computer, causes the computer to implement the method(s) described in the first aspect.

In a twenty-fourth aspect, the present disclosure provides a computer program that, when runs on a computer, causes the computer to implement the method(s) described in the second aspect.

In a twenty-fifth aspect, the present disclosure provides a computer program that, when runs on a computer, causes the computer to implement the method(s) described in the third aspect.

BRIEF DESCRIPTION OF THE DRAWINGS

In order to more clearly illustrate technical solutions in the embodiments of the present disclosure or background technologies, the drawings required for describing the embodiments of the present disclosure or the background technologies will be described below.

FIG. 1 is a schematic architectural diagram of a communication system provided by an embodiment of the present disclosure;

FIG. 2 is a flowchart of a paging processing method provided by an embodiment of the present disclosure;

FIG. 3 is a flowchart of another paging processing method provided by an embodiment of the present disclosure;

FIG. 4 is a flowchart of yet another paging processing method provided by an embodiment of the present disclosure;

FIG. 5 is a flowchart of another paging processing method provided by an embodiment of the present disclosure;

DETAILED DESCRIPTION

Figure 6:
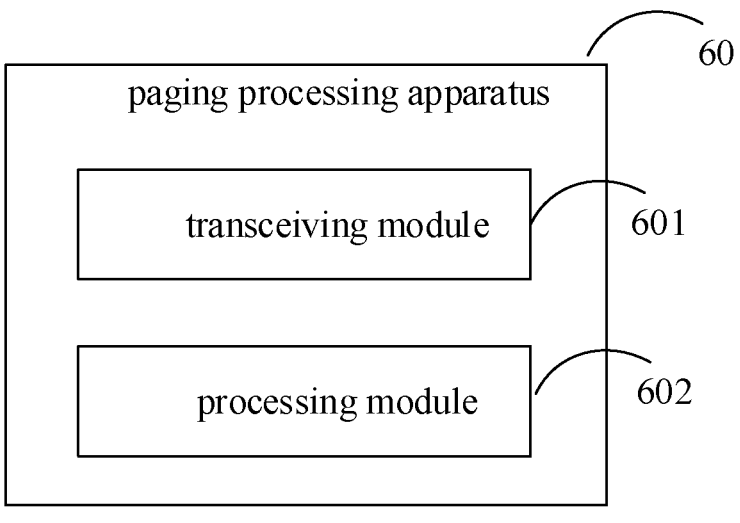
FIG. 6 is a schematic structural diagram of a paging processing apparatus provided by an embodiment of the present disclosure.

Embodiments of the present disclosure are described in detail below, examples of which are illustrated in the accompanying drawings, where the same or similar reference numerals throughout represent the same or similar elements or elements having the same or similar functions. The embodiments described below with reference to the accompanying drawings are exemplary and intended to explain the present disclosure and are not to be construed as limitations of the present disclosure. In the description of the present disclosure, unless otherwise stated, "I" means "or". For example, AB may mean A or B. The expression "and/or" herein is just an association relationship describing associated objects, and means that three relationships may exist. For example, A and/or B may mean: A alone, B alone, and A and B together.

In order to better understand methods disclosed in the embodiments of the present disclosure, a communication system used in the embodiments of the present disclosure is first described below.

Please refer to FIG. 1, which is a schematic architectural diagram of a communication system provided by an embodiment of the present disclosure. The communication system may include but is not limited to: a first network device, a second network device, a first core network device, a second core network device and a terminal device. The number and form of devices shown in FIG. 1 are only for illustration and do not constitute a limitation on the embodiments of the present disclosure. In practical applications, the communication system may include two or more first network devices, second network devices, first core network devices and second core network devices, and two or more terminal devices. The description below is made using an example where the communication system shown in FIG. 1 may include one first network device 111, one second network device 121, one first core network device 112, one second core network device 122 and one terminal device 130.

It should be noted that the technical solutions of the embodiments of the present disclosure may be applied to various communication systems, for example: Long Term Evolution (LTE) system, fifth generation (5G) mobile communication system, 5G New Radio (NR) system, or other future new mobile communication systems.

The first network device 111 and the second network device 121 in the embodiment of the present disclosure are entities on the network side that are used to transmit or receive signals. For example, the first network device 111 and the second network device 121 may be an evolved base station (evolved NodeB, eNB), a transmission reception point (TRP), a next generation base station (next generation NodeB, gNB) in an NR system, a base stations in other future mobile communication systems or an access nodes in wireless fidelity (WiFi) system, etc. The embodiments of the present disclosure do not limit the specific technologies and specific device form adopted by the first network device and the second network device. The first network device and the second network device provided by the embodiments of the present disclosure may be include a central unit (CU) and a distributed unit (DU), where the CU may also be called a control unit. The CU-DU structure may be used to split a protocol layer of a network device (such as base station), some protocol layer functions are controlled by the CU in a centralized manner, and the remaining part or all protocol layer functions are distributed in the DU, and DU is controlled by the CU in a centralized manner.

The first core network device 112 and the first network device 111 in the embodiment of the present disclosure form a first system; the second core network device 122 and the second network device 112 in the embodiment of the present disclosure form a second system. The first core network device 112 and the second core network device 122 in the embodiment of the present disclosure are used to provide user connections, manage users, and complete carrying of service. For example, establishment of a user connection includes functions such as mobility management (MM) or paging. User management includes user description, Qos, and security (corresponding security measures provided by an authentication center include security management of mobile services and security processing of external network access). Carrying a connection includes a connection to an external Public Switched Telephone Network (PSTN), an external circuit data network and a packet data network, the Internet, and so on.

For example, a core network device may include an access and mobility management function (AMF) network element, which is mainly responsible for signaling processing part (that is, control plane functions), including access control, mobility management, attachment and detachment, and other functions.

Optionally, the core network device may further include a Session Management Function (SMF) network element which is responsible for session management functions, such as session establishment, modification, and release, and so on.

Optionally, the core network device may further include a User Plane Function (UPF) network element which is responsible for forwarding and receiving of user data in terminal device(s). The UPF network element may receive user data from a data network and transmit the user data to a terminal device through an access network device. The UPF network element may further receive user data from a terminal device through an access network device and forward the user data to a data network. The transmission resources and scheduling functions in the UPF network element for providing services for a terminal device are managed and controlled by the SMF network element. The core network device involved in the embodiments of the present disclosure is not limited to the AMF network element, the SMF network element, or the UPF network element.

The terminal device 130 in the embodiment of the present disclosure is a multi-card terminal device. For example, the multi-card terminal device may be a dual-card terminal device. The terminal device 130 in the embodiment of the present disclosure is an entity on the user side that is used to receive or transmit signals, such as a mobile phone. The terminal device may also be called a terminal, user equipment (UE), a mobile station (MS), a mobile terminal (MT), and so on. The terminal device may be a car with a communication function, a smart car, a mobile phone, a wearable device, a tablet computer (Pad), a computer with a wireless transceiving function, a virtual reality (VR) terminal device, an augmented reality (AR) terminal device, a wireless terminal device in industrial control, a wireless terminal device in self-driving, a wireless terminal device in remote medical surgery, a wireless terminal device in smart grid, a wireless terminal device in transportation safety, a wireless terminal device in smart city, a wireless terminal device in smart home, etc. The embodiments of the present disclosure do not limit the specific technologies and specific device form adopted by the terminal device.

It may be understood that the communication system described in the embodiments of the present disclosure is to more clearly illustrate the technical solutions of the embodiments of the present disclosure, and does not constitute a limitation on the technical solutions provided by the embodiments of the present disclosure. As those of ordinary skill in the art will know, with the evolution of system architecture and emergence of new service scenarios, the technical solutions provided by the embodiments of the present disclosure are also applicable to similar technical problems.

A paging processing method, a paging processing apparatus, a communication apparatus and a storage medium provided by the present disclosure will be introduced in detail below with reference to the accompanying drawings.

FIG. 2 is a flowchart of a paging processing method provided by an embodiment of the present disclosure. It should be noted that the paging processing method in the embodiment of the present disclosure may be applied to a multi-card terminal device. As an example, the multi-card terminal device may include a first subscriber identity card and a second subscriber identity card. As shown in FIG. 2, the paging processing method may include but is not limited to the following steps.

In step 201, in response to that the second subscriber identity card in an idle state in the multi-card terminal device receives a paging message sent from a second network device, the first subscriber identity card in a connected state in the multi-card terminal device sends first busy indication information to a first core network device.

In an embodiment of the present disclosure, the first busy indication information is used to indicate that the multi-card terminal device has received the paging message from the second network device and decided not to respond temporarily.

It should be noted that in an embodiment of the present disclosure, the first subscriber identity card of the multi-card terminal device communicates with a first network device, so that the first subscriber identity card is in the connected state. The second subscriber identity card of the multi-card terminal device is in the idle state. When the multi-card terminal device communicates with the first system, the multi-card terminal device needs to intermittently detect the second system, such as monitoring paging. When the second subscriber identity card in the idle state receives a paging message sent from the second network device, the first subscriber identity card in the connected state sends the first busy indication information to the first core network device. The first busy indication information indicates that the multi-card terminal device has received the paging message of the second network device and decided not to respond temporarily, so that the multi-card terminal device can inform the second network device of the busy indication information of the second subscriber identity card in the idle state under the premise of not affecting the communication connection of the first subscriber identity card in the connected state. While keeping the communication connection of the first subscriber identity card uninterrupted, the technical solution can avoid a situation where the second network device keeps paging the terminal because the second network device does not receive a response from the multi-card terminal device, thereby avoiding waste of signaling resources and also avoiding erroneous statistics or operations of the second network device.

Optionally, in other embodiments of the present disclosure, the second subscriber identity card of the multi-card terminal device may communicate with the second network device, so that the second subscriber identity card is in the connected state. The first subscriber identity card of the multi-card terminal device is in the idle state. In this embodiment, when the first subscriber identity card in the idle state receives a paging message sent from the first network device, the second subscriber identity card in the connected state sends busy indication information to the second core network device. The busy indication information indicates that the multi-card terminal device has received the paging message from the first network device and decided not to respond temporarily, so that the multi-card terminal device can inform the first network device of the busy indication information of the first subscriber identity card in the idle state under the premise of not affecting the communication connection of the second subscriber identity card in the connected state. While keeping the communication connection of the second subscriber identity card uninterrupted, the technical solution can avoid a situation where the first network device keeps paging the terminal because the first network device does not receive a response from the multi-card terminal device, thereby avoiding waste of signaling resources and also avoiding erroneous statistics or operations of the first network device.

That is to say, in the embodiments of the present disclosure, when a subscriber identity card in the idle state in the multi-card terminal device receives a paging message sent from a corresponding network device, a subscriber identity card in the connected state in the multi-card terminal device can send busy indication information to a corresponding network device to indicate that the multi-card terminal device has received the paging message of the network device corresponding to the subscriber identity card in the idle state and decided not to respond temporarily. In this way, the multi-card terminal device can notify the corresponding network device of the busy indication information of the subscriber identity card in the idle state under the premise of not affecting the communication connection of the subscriber identity card in the connected state. The technical solution can avoid a situation where the network device keeps paging the terminal because the network device does not receive a response from the multi-card terminal device. The technical solution can avoid wastes of signaling resources, and avoid erroneous statistics or operations of the network device.

In order to facilitate description and understanding of the embodiments of the present disclosure, the description will be made by taking the case where the first subscriber identity card of the multi-card terminal device communicates with the first network device and the second subscriber identity card is in the idle state as an example to introduce the paging processing methods provided by the embodiments of the present disclosure.

It should be noted that after receiving the paging message sent from the second network device, the second subscriber identity card of the multi-card terminal device needs to determine whether it is needed to respond to the paging message of the second network device according to a certain criterion. Optionally, referring to FIG. 3, FIG. 3 is a flowchart of another paging processing method provided by an embodiment of the present disclosure. It should be noted that the paging processing method in the embodiment of the present disclosure may be applied to a multi-card terminal device. As an example, the multi-card terminal device may include a first subscriber identity card and a second subscriber identity card. As shown in FIG. 3, the paging processing method may include but is not limited to the following steps.

In some embodiments of the present disclosure, the paging processing method may include step 301: in response to that the second subscriber identity card in the idle state in the multi-card terminal device receives the paging message sent from the second network device, whether it is needed to responded to the paging message of the second network device is determined according to a preset criterion.

In some embodiments of the present disclosure, when the second subscriber identity card in the idle state in the multi-card terminal device receives the paging message sent from the second network device, the second subscriber identity card may determine whether it is needed to respond to the paging message of the second network device according to a preset criterion, and send the determination result to the multi-card terminal device, so that the multi-card terminal device knows whether the second subscriber identity card needs to respond to the paging message of the second network device or does not respond to the paging message of the second network device. Or, in other embodiments of the present disclosure, when the second subscriber identity card in the idle state in the multi-card terminal device receives the paging message sent from the second network device, the second subscriber identity card sends relevant information to the multi-card terminal device, and the multi-card terminal device determines whether it is needed to respond to the paging message of the second network device according to a preset criterion and the relevant information sent from the second subscriber identity card.

It should be noted that in the embodiments of the present disclosure, there are many implementation methods for determining whether it is needed to respond to the paging message of the second network device according to a preset criterion. The difference in the implementation methods mainly depends on the content of the preset criterion. Two different examples will be given below to introduce how to determine whether it is needed to respond to the paging message of the second network device.

Example 1

Whether it is needed to respond to the paging message of the second network device is determined according to a different service priority.

In this example, the preset criterion may be different service priorities. For example, when the second subscriber identity card in the idle state in the multi-card terminal device receives the paging message sent from the second network device, it may determine whether the second subscriber identity card needs to respond to the paging message of the second network device according to different service priorities. A service may be understood as a game service or an incoming call service. It is assumed that the priority of the game service is greater than the priority of the incoming call service. When the second subscriber identity card in the idle state receives the paging message sent from the second network device, because the priority of the game service is greater than the priority of the incoming call service, it may be determined that the second subscriber identity card does not respond to the paging message of the second network device.

Example 2

Whether it is needed to respond to the paging message of the second network device is determined according to a quality of service configuration of a network system corresponding to the first subscriber identity card.

In this example, the preset criterion may be the Quality of Service (QoS) configuration of the network system corresponding to the first subscriber identity card. For example, when the second subscriber identity card in the idle state in the multi-card terminal device receives the paging message sent from the second network device, whether the second subscriber identity card needs to respond to the paging message of the second network device may be determined according to the QoS configuration of the network system corresponding to the first subscriber identity card.

For example, assuming that there is a throughput threshold in the QoS configuration, and the throughput of the network system corresponding to the first subscriber identity card has exceeded the throughput threshold in the QoS configuration, it may be determined that the second subscriber identity card needs to respond to paging message of the second network device. For another example, assuming that there is a delay threshold in the QoS configuration, and the delay of the network system corresponding to the first subscriber identity card is greater than the delay threshold in the QoS configuration, it may be determined that the second subscriber identity card needs to respond to the paging message of the second network device. For another example, assuming that the QoS configuration has a throughput threshold and a delay threshold, and the throughput of the network system corresponding to the first subscriber identity card has exceeded the throughput threshold in the QoS configuration, and/or the delay of the network system corresponding to the first subscriber identity card has exceeded the delay threshold in the QoS configuration, it may be determined that the second subscriber identity card needs to respond to the paging message of the second network device. If the throughput of the network system corresponding to the first subscriber identity card does not exceed the throughput threshold in the QoS configuration, and the delay of the network system corresponding to the first subscriber identity card does not exceed the delay threshold in the QoS configuration, it may be determined that the second subscriber identity card does not need to respond to the paging message of the second network device.

In some embodiments of the present disclosure, the preset criterion may be configured by a network device through Non-access stratum (NAS) signaling or Radio Resource Control (RRC) signaling. For example, the preset criterion may be configured by the first network device through NAS signaling or RRC signaling, and then the configured preset criterion is sent to the second system for use. For another example, the preset criterion may be configured directly by the second network device through NAS signaling or RRC signaling, so that the second subscriber identity card determines whether it needs to respond to the paging message of the second network device according to the preset criterion.

In other embodiments of the present disclosure, the preset criterion may be configured by the multi-card terminal device. For example, the preset criterion may be directly configured by the multi-card terminal device: the multi-card terminal device may directly configure that determining of whether it is needed to respond to the paging message of the second network device is based on different service priorities; or, the multi-card terminal device may directly configure that determining of whether it is needed to respond to the paging message of the second network device is based on the QoS configuration of the network system corresponding to the first subscriber identity card.

Optionally, after receiving the paging signaling sent from the second network device, the second subscriber identity card in the idle state determines according to the preset criterion that it needs to respond to the paging message of the second network device, the second subscriber identity card communicates with the second network device, and the first subscriber identity card is in the idle state.

In some embodiments of the present disclosure, the paging processing method may include step 302: in response to that the multi-card terminal device decides not to respond to the paging message of the second network device, the second subscriber identity card sends second busy indication message to the first subscriber identity card. The second busy indication information is used to indicate that the second subscriber identity card has received the paging message of the second network device and decided not to respond temporarily.

Optionally, when it is determined that the second subscriber identity card does not respond to the paging message of the second network device, the second subscriber identity card sends second busy indication information to the first subscriber identity card, and the second busy indication information indicates that the second subscriber identity card has received the paging message of the second network device or the second core network device, but decided not to respond temporarily.

It should be noted that the first subscriber identity card in the embodiments of the present disclosure may receive the second busy indication information through different ways. That is to say, the second busy indication information may be transmitted through multiple ways. As an example, the second busy indication information may be first sent from the second subscriber identity card to a processor of the multi-card terminal device, and then sent from the processor to the first subscriber identity card. As another example, the second busy indication information may be directly sent from the second subscriber identity card to the first subscriber identity card.

It should be noted that in an embodiment of the present disclosure, when the second subscriber identity card sends the second busy indication information to the first subscriber identity card, it may further send other information at the same time. In an implementation, when the second subscriber identity card sends the second busy indication information to the first subscriber identity card, the second subscriber identity card may further send information of the second subscriber identity card to the first subscriber identity card; and/or, the second subscriber identity card may further send information of the second network device to the first subscriber identity card; and/or, the second subscriber identity card may further send information of the second core network device to the first subscriber identity card; and/or, the second subscriber identity card may further send to the first subscriber identity card a cause why the second subscriber identity card does not respond to paging of the second network device; and/or, the second subscriber identity card may further send a busy duration of the second subscriber identity card to the first subscriber identity card.

That is to say, when the second subscriber identity card sends the second busy indication information to the first subscriber identity card, it may further send at the same time the information of the second subscriber identity card, and/or the information of the second network device, and/or, the information of the second core network device, and/or the cause for not responding to paging of the second network device, and/or busy duration, etc.

In some embodiments of the present disclosure, the paging processing method may include step 303: the first subscriber identity card sends the first busy indication information to the first core network device after receiving the second busy indication information.

The first busy indication information is used to indicate that the multi-card terminal device has received the paging message of the second network device and decided not to respond temporarily.

That is to say, after receiving the second busy indication information from the second subscriber identity card, the first subscriber identity card sends the first busy indication information to the first core network device, indicating that the multi-card terminal device has received the paging message of the second network device or the second core network device but decided not to respond temporarily.

It should be noted that, in an embodiment of the present disclosure, when the first subscriber identity card sends the first busy indication information to the first core network device, it may further send other information at the same time. In an implementation, when the first subscriber identity card sends the first busy indication information to the first core network device, the first subscriber identity card may further send information of the second subscriber identity card to the first core network device; and/or, the first subscriber identity card may further send information of the second network device to the first core network device; and/or, the first subscriber identity card may further send information of the second core network device to the first core network device; and/or, the first subscriber identity card may further send to the first core network device a cause why the second subscriber identity card does not respond to the paging of the second network device; and/or, the first subscriber identity card may further send a busy duration of the second subscriber identity card to the first core network device.

That is to say, when the first subscriber identity card sends the first busy indication information to the first core network device, it may further send at the same time the information of the second subscriber identity card, and/or the information of the second network device, and/or information of the second core network device, and/or a cause for not responding to the paging by the second network device, and/or a busy duration, etc.

In an implementation, the first subscriber identity card may send the first busy indication information to the first network device through NAS signaling. As an example, the first busy indication information may be sent to the first network device by modifying mobility registration update (Mobility Registration Update) signaling.

It should be noted that, in some embodiments of the present disclosure, the first core network device and the second core network device may be the same core network device. That is to say, after the second subscriber identity card receives the paging message sent from the second network device, the first subscriber identity card sends a busy indication to the first core network device to indicate that the multi-card terminal device has received the paging message of the second network device and decided not to respond for the time being. Since the first core network device and the second core network device are the same core network device, when the first core network device receives the busy indication sent from the first subscriber identity card, the second core network device also knows that the second subscriber identity card has received the paging message of the second network device but decided not to respond temporarily. In this way, the multi-card terminal device can notify the second network of the busy indication information of the second subscriber identity card under the premise of not affecting the communication connection of the first subscriber identity card. Accordingly, while the communication connection of the first subscriber identity card is kept uninterrupted, the technical solution can avoid a situation where the second network device continues to page the terminal all the time because the second network device does not receive a response from the multi-card terminal device. This technical solution can avoid wastes of signaling resources, and avoid erroneous statistics or operations of the second network device.

In other embodiments of the present disclosure, the first core network device and the second core network device may be different core network devices. In order for the second core network device to know that the second subscriber identity card has received the paging message of the second network device but decided not to respond temporarily, the first core network device may send the first busy indication information, which is sent from the first subscriber identity card, to the second core network device. That is to say, when the first core network device and the second core network device are different core network devices, after the first subscriber identity card receives the second busy indication information sent from the second subscriber identity card, it sends first busy indication message to the first network device. After receiving the first busy indication information sent from the first subscriber identity card, the first core network device sends the first busy indication information to the second core network device, so that the second core network device can know that the second subscriber identity card has received the paging message of the second network device but decided not to respond temporarily.

It should be understood that FIG. 3 shows a situation in which steps 301 to 303 are combined and implemented continuously. However, those skilled in the art may understand that the above steps may be implemented separately as needed. For example, the implementation of step 302 is not premised on step 301.

It may be understood that in the above description, the implementations of the paging processing method of the embodiments of the present disclosure are described from the multi-card terminal device side. An embodiment of the present disclosure further proposes another paging processing method. The implementation of the paging processing method will be described below from the first core network device side. FIG. 4 is a flowchart of yet another paging processing method provided by an embodiment of the present disclosure. It should be noted that the paging processing method in the embodiment of the present disclosure may be applied to the first core network device. As shown in FIG. 4, the paging processing method may include but is not limited to the following steps.

In step 401, first busy indication information sent from a first subscriber identity card in a connected state in a multi-card terminal device is received. The first busy indication information is used to indicate that the multi-card terminal device has received a paging message of a second network device and decided not to respond temporarily. The second network device is a network device corresponding to a second subscriber identity card in an idle state in the multi-card terminal device.

For example, the first subscriber identity card of the multi-card terminal device communicates with the first network device, so that the first subscriber identity card is in the connected state. The second subscriber identity card of the multi-card terminal device is in the idle state. When the multi-card terminal device communicates with a first system, it needs to intermittently detect the second system, such as monitoring paging. When the second subscriber identity card in the idle state receives the paging message sent from the second network device, the first subscriber identity card in the connected state sends the first busy indication information to the first core network device. The first core network device may receive the first busy indication information sent from the first subscriber identity card, and the first busy indication information indicates that the multi-card terminal device has received the paging message of the second network device and decided not to respond temporarily. In this way, the multi-card terminal device can notify the second network device of the busy indication information of the second subscriber identity card in the idle state under the premise of not affecting the communication connection of the first subscriber identity card in the connected state. While maintaining the communication connection of the first subscriber identity card not interrupted, the technical solution can avoid a situation where the second network device keeps paging the multi-card terminal device because it does not receive a response from the multi-card terminal device, thereby avoiding the waste of signaling resources and also avoiding error statistics or operations of the second network device.

It should be noted that, when the first subscriber identity card sends the first busy indication information to the first core network device, it may further send other information at the same time. In an implementation, when the first subscriber identity card sends the first busy indication information to the first core network device, the first subscriber identity card may further send information of the second subscriber identity card to the first core network device; and/or, the first subscriber identity card may further send information of the second network device to the first core network device; and/or, the first subscriber identity card may further send information of the second core network device to the first core network device; and/or, the first subscriber identity card may further send to the first core network device a cause why the second subscriber identity card does not respond to paging of the second network device; and/or, the first subscriber identity card may further send a busy duration of the second subscriber identity card to the first core network device. The above other information may be sent from the second subscriber identity card to the first subscriber identity card while the second subscriber identity card sends the second busy indication information to the first subscriber identity card. This will be further explained below.

It should be noted that, in some embodiments of the present disclosure, the first core network device and the second core network device may be the same core network device. That is to say, when the first core network device receives the first busy indication information sent from the first subscriber identity card, since the first core network device and the second core network device are the same core network device, when the first core network device receives the busy indication sent from the first subscriber identity card, the second core network device also knows that the second subscriber identity card has received the paging message of the second network device but decided not to respond temporarily. After receiving the first busy indication information sent from the first subscriber identity card, the first core network device may notify, through an interface between a core network device and a network device, the second network device to suspend paging to the second subscriber identity card. Alternatively, after receiving the first busy indication information sent from the first subscriber identity card, the first core network device may directly suspend paging to the second subscriber identity card. Alternatively, after receiving the first busy indication information sent from the first subscriber identity card, the first core network device may suspend paging to the second subscriber identity card based on the busy duration in the first busy indication information. For example, the busy duration in the first busy indication information is 5 minutes, which means that the second subscriber identity card will not respond to paging within the 5 minutes, and the first core network device suspend paging to the second subscriber identity card within the 5 minutes.

In other embodiments of the present disclosure, the first core network device and the second core network device may be different core network devices. In order for the second core network device to know that the second subscriber identity card has received the paging message of the second network device but decided not to respond temporarily, the first core network device may send the first busy indication information, which is sent from the first subscriber identity card, to the second core network device. That is to say, when the first core network device and the second core network device are different core network devices, the first subscriber identity card sends the first busy indication information to the first core network device after receiving the second busy indication information sent from the second subscriber identity card. After receiving the first busy indication information sent from the first subscriber identity card, the first core network device sends the first busy indication information to the second core network device, so that the second core network device can know that the second subscriber identity card received the paging message of the second core network device but decided not to respond temporarily.

By implementing the embodiments of the present disclosure, the multi-card terminal device can inform the second network of the busy indication information of the second subscriber identity card in the idle state under premise of not affecting the communication connection of the first subscriber identity card in the connected state. While keeping the communication connection of the first subscriber identity card uninterrupted, the technical solution can avoid a situation where the second network continues to page the terminal all the time because the second network does not receive a response from the multi-card terminal device. This technical solution can avoid wastes of signaling resources, and avoid erroneous statistics or operations of the second network.

It may be understood that in the above description, the implementations of the paging processing method in the embodiments of the present disclosure are described from the first core network device side. An embodiment of the present disclosure also proposes another paging processing method. The implementation of this paging processing method will be described below from a second core network device side. FIG. 5 is a flowchart of yet another paging processing method provided by an embodiment of the present disclosure. It should be noted that the paging processing method in the embodiment of the present disclosure may be applied to a second core network device.

It should also be noted that the first core network device and the second core network device in this embodiment of the present disclosure are not the same core network device. As shown in FIG. 5, the paging processing method may include but is not limited to the following steps.

In step 501, busy indication information sent from a first core network device is received. The busy indication information is first busy indication information received by the first core network device and sent from a first subscriber identity card in a connected state in a multi-card terminal device.

The first busy indication information is used to indicate that the multi-card terminal device has received a paging message of a second network device and decided not to respond temporarily. The second network device is a network device corresponding to a second subscriber identity card in an idle state in the multi-card terminal device.

For example, when the second subscriber identity card in the idle state in the multi-card terminal device receives the paging message sent from the second network device, the second subscriber identity card may determine whether it needs to respond to the paging message of the second network device according to a preset criterion, and sends a determination result to the multi-card terminal device, so that the multi-card terminal device knows whether the second subscriber identity card needs to respond to the paging message of the second network device or does not respond to the paging of the second network device. Or, in other embodiments of the present disclosure, when the second subscriber identity card in the idle state in the multi-card terminal device receives the paging message sent from the second network device, the second subscriber identity card sends relevant information to the multi-card terminal device, and the multi-card terminal device determines whether it is needed to respond to the paging message of the second network device based on a preset criterion and the relevant information sent from the second subscriber identity card.

Optionally, when the second subscriber identity card decides not to respond to the paging message of the second network device, the second subscriber identity card sends second busy indication information to the first subscriber identity card to indicate that the second subscriber identity card has received the paging message of the second network device or the second core network device and decided not to respond temporarily. After receiving the second busy indication information from the second subscriber identity card, the first subscriber identity card sends the first busy indication information to the first core network device, indicating that the multi-card terminal device has received the paging message of the second network device or the second core network device but decided not to respond temporarily.

In this embodiment of the present disclosure, the first core network device and the second core network device are not the same core network device. In order for the second core network device to know that the second subscriber identity card has received the paging message of the second network device but decided not to respond temporarily, the first core network device may send the first busy indication information, which is sent from the first subscriber identity card, to the second core network device. That is to say, when the first core network device and the second core network device are different core network devices, the first subscriber identity card sends first busy indication information to the first core network device after receiving the second busy indication information sent from the second subscriber identity card. After receiving the first busy indication information sent from the first subscriber identity card, the first core network device sends the first busy indication information to the second core network device, so that the second core network device can receive the busy indication information sent from the first core network device. In this way, the second core network device can know that the second subscriber identity card has received the paging message of the second network device but decided not to respond temporarily.

Optionally, while receiving the busy indication information sent from the first core network device, the second core network device may also receive information of the second subscriber identity card sent from the first core network device; and/or, the second core network device may also receive information of the second network device sent from the first core network device; and/or, the second core network device may also receive information of the second core network device sent from the first core network device; and/or the second core network device may also receive a cause why the paging of the second network device is not responded sent from the first core network device; and/or, the second core network device may also receive a busy duration of the second subscriber identity card sent from the first core network device.

It should be noted that, in some embodiments of the present disclosure, after receiving the busy indication information sent from the first core network device, the second core network device may notify, through an interface between a core network device and a network device, the second network device to suspend paging to the second subscriber identity card. Alternatively, after receiving the busy indication information sent from the first core network device, the second core network device may suspend paging to the second subscriber identity card. Alternatively, after receiving the busy indication information sent from the first core network device, the second core network device may suspend paging to the second subscriber identity card based on the first busy indication information. For example, the busy duration in the first busy indication information is 5 minutes, it means that the second subscriber identity card will not respond to paging within the 5 minutes, and the second core network device suspends paging to the second subscriber identity card within the 5 minutes.

By implementing the embodiments of the present disclosure, the multi-card terminal device can inform the second network of the busy indication information of the second subscriber identity card in the idle state under the premise of not affecting the communication connection of the first subscriber identity card in the connected state. While keeping the communication connection of the first subscriber identity card uninterrupted, the technical solution can avoid a situation where the second network continues to page the terminal all the time because the second network does not receive a response from the multi-card terminal device. This technical solution can avoid wastes of signaling resources, and avoid erroneous statistics or operations of the second network.

In the above embodiments provided by the present disclosure, the methods provided by the embodiments of the present disclosure are introduced from the perspectives of the multi-card terminal device, the first core network device, and second core network device. In order to realize respective functions in the methods provided by the above embodiments of the present disclosure, the multi-card terminal device, the first core network device and the second core network device may include a hardware structure, or a software module, and the functions may be implemented by the hardware structure, the software module, or the hardware structure plus the software module. A certain function among the above functions may be implemented by a hardware structure, a software module, or a hardware structure plus a software module.

FIG. 6 is a schematic structural diagram of a paging processing apparatus 60 provided by an embodiment of the present disclosure. The paging processing apparatus 60 shown in FIG. 6 may include a transceiving module 601. The transceiving module 601 may include a sending module and/or a receiving module. The sending module is configured to implement a sending function, and the receiving module is used to implement a receiving function. The transceiving module 601 may implement the sending function and/or the receiving function.

The paging processing apparatus 60 may be a multi-card terminal device, or may be an apparatus in a multi-card terminal device, or may be an apparatus that can be used in conjunction with the multi-card terminal device. Alternatively, the paging processing apparatus 60 may be a first core network device, or may be an apparatus in the first core network device, or may be an apparatus that can be used in conjunction with the first core network device. Alternatively, the paging processing apparatus 60 may be a second core network device, or may be an apparatus in the second core network device, or may be an apparatus that can be used in conjunction with the second core network device.

When the paging processing apparatus 60 is a multi-card terminal device: in an embodiment of the present disclosure, the transceiving module 601 is configured to, in response to that a second subscriber identity card in an idle state in the multi-card terminal device receives a paging message sent from a second network device, send, by a first subscriber identity card in a connected state in the multi-card terminal device, first busy indication information to a first core network device; the first busy indication information is used to indicate that the multi-card terminal device has received the paging message of the second network device and decided not to respond temporarily.

In an implementation, the transceiving module 601 is further configured to: when the first subscriber identity card sends the first busy indication information to the first core network device, send information of the second subscriber identity card to the first core network device; and/or, send, by the first subscriber identity card, information of the second network device to the first core network device; and/or, send, by the first subscriber identity card, information of a second core network device to the first core network device; and/or, send to the first core network device, by the first subscriber identity card, a cause why the second subscriber identity card does not respond to paging of the second network device; and/or, send, by the first subscriber identity card, a busy duration of the second subscriber identity card to the first core network device.

In an optional implementation, the transceiving module 601 is specifically configured to: determining whether it is needed to respond to the paging message of the second network device according to a preset criterion; in response to that the multi-card terminal device decides not to respond to the paging message of the second network device, send, by the second subscriber identity card, second busy indication information to the first subscriber identity card, where the second busy indication information is used to indicate that the second subscriber identity card has received the paging message of the second network device and decided not to respond temporarily; and after receiving the second busy indication information, send, by the first subscriber identity card, the first busy indication information to the first core network device.

Optionally, the transceiving module 601 is specifically configured to: determine whether it is needed to respond to the paging message of the second network device according to a different service priority; or, determine whether it is needed to respond to the paging message of the second network device according to a quality of service configuration of a network system corresponding to the first subscriber identity card.

In an embodiment of the present disclosure, the preset criterion is configured by a network device through Non-Access Stratum (NAS) signaling or Radio Resource Control (RRC) signaling; or, the preset criterion is configured by the multi-card terminal device.

As an example, when the second subscriber identity card sends the second busy indication information to the first subscriber identity card, the transceiving module 601 is further configured to: send, by the second subscriber identity card, information of the second subscriber identity card to the first subscriber identity card; and/or, send, by the second subscriber identity card, information of the second network device to the first subscriber identity card; and/or, send, by the second subscriber identity card, information of a second core network device to the first subscriber identity card; and/or, send to the first subscriber identity card, by the second subscriber identity card, a cause why the second subscriber identity card does not respond to paging of the second network device; and/or, send, by the second subscriber identity card, a busy duration of the second subscriber identity card to the first subscriber identity card.

In an implementation, the first core network device and the second core network device are a same core network device.

In another implementation, the first core network device and the second core network device are different core network devices, where the first core network device sends the first busy indication information, which is sent from the first subscriber identity card, to the second core network device.

In an embodiment of the present disclosure, the first subscriber identity card sends the first busy indication information through NAS signaling.

When the paging processing apparatus 60 is a first core network device: in an embodiment of the present disclosure, the transceiving module 601 is configured to receive first busy indication information sent from a first subscriber identity card in a connected state in a multi-card terminal device; where the first busy indication information is used to indicate that the multi-card terminal device has received a paging message of a second network device and decided not to respond temporarily, and the second network device is a network device corresponding to a second subscriber identity card in an idle state in the multi-card terminal device.

In an implementation, the transceiving module 601 is further configured to, when receiving the first busy indication information sent from the first subscriber identity card, receive information of the second subscriber identity card sent from the first subscriber identity card; and/or, receive information of the second network device sent from the first subscriber identity card; and/or, receive information of a second core network device sent from the first subscriber identity card; and/or, receive a cause why paging of the second network device is not responded sent from the first subscriber identity card; and/or, receive a busy duration of the second subscriber identity card sent from the first subscriber identity card.

In an implementation, the first core network device and the second core network device are a same core network device.

In an optional implementation, the processing module 602 is configured to, after the transceiving module receives the first busy indication information sent from the first subscriber identity card, notify, through an interface between a core network device and a network device, the second network device to suspend paging to the second subscriber identity card; or, suspend paging to the second subscriber identity card; or, suspend paging to the second subscriber identity card based on the first busy indication information.

Optionally, the first core network device and the second core network device are different core network devices. In an implementation, the transceiving module 601 is further configured to: sending the first busy indication information, which is sent from the first subscriber identity card, to the second core network device.

When the paging processing apparatus 60 is the second core network device: in an embodiment of the present disclosure, the transceiving module 601 is configured to receive busy indication information sent from a first core network device, where the busy indication information is first busy indication information which is received by the first core network device and sent from a first subscriber identity card in a connected state in a multi-card terminal device. The first busy indication information is used to indicate that the multi-card terminal device has received a paging message of a second network device and decided not to respond temporarily, and the second network device is a network device corresponding to a second subscriber identity card in an idle state in the multi-card terminal device.

In an implementation, the processing module 602 is configured to, after the transceiving module receives the busy indication information sent from the first core network device, notify, through an interface between a core network device and a network device, the second network device to suspend paging to the second subscriber identity card; or, suspend paging to the second subscriber identity card; or, suspend paging to the second subscriber identity card based on the first busy indication information.

Regarding the apparatus in the above embodiments, the specific manner in which each module performs operations has been described in detail in the embodiments related to the methods, and will not be described in detail here.

Figure 7:
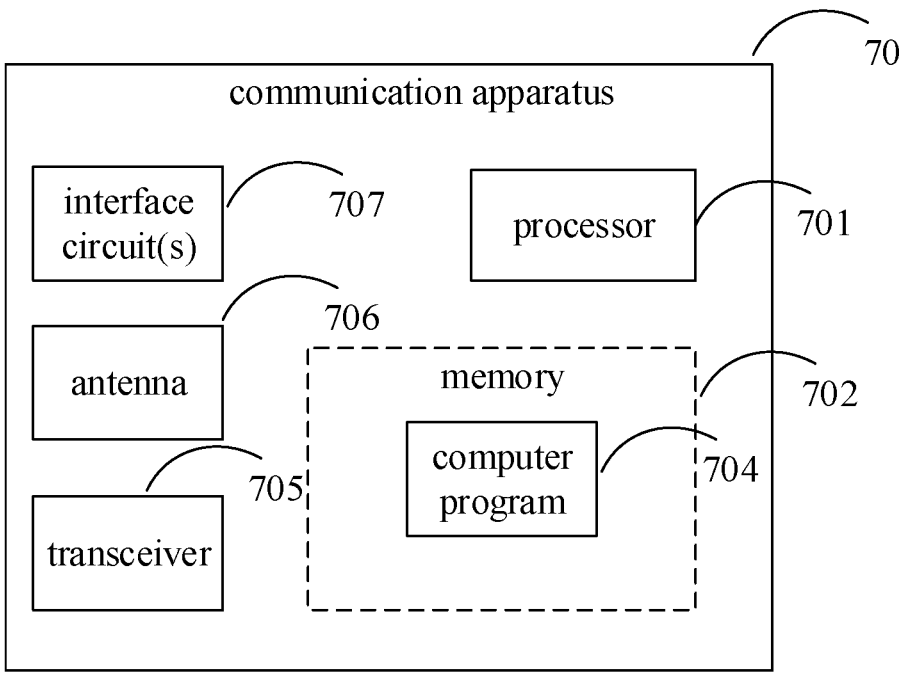
FIG. 7 is a schematic structural diagram of a communication apparatus provided by an embodiment of the present disclosure.

FIG. 7 is a schematic structural diagram of a communication apparatus 70 provided by an embodiment of the present disclosure. The communication apparatus 70 may be a multi-card terminal device, or may be a first core network device, or may be a second core network device, or may be a chip, chip system or processor and so on that supports the multi-card terminal device to implement the above methods, or may be a chip, chip system or processor and so on that supports the first core network device to implement the above methods, or may be a chip, chip system or processor and so on that supports the second core network device to implement the above methods. The apparatus may be used to implement the methods described in any of the above method embodiments. For details, please refer to the descriptions in the above method embodiments.

The communication apparatus 70 may include one or more processors 701. The processor 701 may be a general-purpose processor or a special-purpose processor, etc. For example, it can be a baseband processor or a central processor. The baseband processor may be used to process communication protocols and communication data, and the central processor may be used to control the communication apparatus (such as base station, baseband chip, terminal device, terminal device chip, DU or CU, etc.), execute a computer program, and processes data for a computer program.

Optionally, the communication apparatus 70 may further include one or more memories 702, on which a computer program 704 may be stored, and the processor 701 executes the computer program 704, so that the communication apparatus 70 performs the methods described in the above method embodiments. Optionally, data may also be stored in the memory 702. The communication apparatus 70 and the memory 702 may be provided separately or integrated together.

Optionally, the communication apparatus 70 may further include a transceiver 705 and an antenna 706. The transceiver 705 may be called a transceiving unit, a transceiving device, or a transceiving circuit, etc., and is used to realize transmission and receiving functions. The transceiver 705 may include a receiver and a transmitter. The receiver may be called a receiving device or a receiving circuit, etc., and is used to realize the receiving function; the transmitter may be called a transmitting device or a transmitting circuit, etc., and is used to realize the transmitting function.

Optionally, the communication apparatus 70 may further include one or more interface circuits 707. The interface circuits 707 are used to receive code instructions and transmit them to the processor 701. The processor 701 runs the code instructions to cause the communication apparatus 70 to perform the methods described in any of the above method embodiments.

When the communication apparatus 70 is the multi-card terminal device, the transceiver 705 is configured to: perform step 201 in FIG. 2; perform step 301, step 302 and step 303 in FIG. 3; perform step of: "when the first subscriber identity card sends the first busy indication information to the first core network device, also sending, by the first subscriber identity card, information of the second subscriber identity card to the first core network device; and/or, sending, by the first subscriber identity card, information of the second network device to the first core network device; and/or, sending, by the first subscriber identity card, information of the second core network device to the first core network device; and/or, sending to the first core network device, by the first subscriber identity card, a cause why the second subscriber identity card does not respond to paging of the second network device; and/or, sending, by the first subscriber identity card, a busy duration of the second subscriber identity card to the first core network device".

When the communication apparatus 70 is the first core network device, the transceiver 705 is configured to: perform step 401 in FIG. 4; perform the step of: "when receiving the first busy indication information sent from the first subscriber identity card, also receiving information of the second subscriber identity card sent from the first subscriber identity card; and/or receiving information of a second network device sent from the first subscriber identity card; and/or, receiving information of the second core network device sent from the first subscriber identity card; and/or, receiving a reason for not responding to the paging of the second network device sent by the first subscriber identity card; and/or, receiving a busy duration of the second subscriber identity card sent from the first subscriber identity card; perform the step of "sending the first busy indication information, which is sent by the first subscriber identity card, to the second core network device".

The processor 701 is configured to perform the step of "notifying, through an interface between a core network device and a network device, the second network device to suspend paging to the second subscriber identity card; or suspending paging to the second subscriber identity card; or, suspend paging to the second subscriber identity card based on the first busy indication information".

When the communication apparatus 70 is the second core network device, the transceiver 705 is configured to: perform step 501 in FIG. 5. The processor 701 is configured to perform the step of "notifying, through an interface between a core network device and a network device, the second network device to suspend paging to the second subscriber identity card; or suspending paging to the second subscriber identity card; or, suspend paging to the second subscriber identity card based on the first busy indication information".

In an implementation, a transceiver for implementing receiving and transmitting functions may be included in the processor 701. For example, the transceiver may be a transceiving circuit, or an interface, or an interface circuit. The transceiving circuit, interface or interface circuit used to implement the receiving and transmitting functions may be separate or integrated together. The above-mentioned transceiving circuit, interface or interface circuit may be used for reading and writing of codes/data, or the above-mentioned transceiving circuit, interface or interface circuit may be used for signal transmission or delivery.

In an implementation, the memory 702 may store a computer program 704, and the computer program 704 runs on the processor 701, causing the communication apparatus to perform the methods described in any of the above method embodiments. The computer program 704 may be solidified in the processor 701, in which case the processor 701 may be implemented in hardware.

In an implementation, the communication apparatus 70 may include a circuit, and the circuit may implement the functions of sending or receiving or communicating in the foregoing method embodiments. The processor and transceiver described in the present disclosure may be implemented in Integrated Circuit (IC), analog IC, Radio Frequency Integrated Circuit (RFIC), mixed signal IC, Application Specific Integrated Circuit (ASIC), Printed Circuit Board (PCB), electronic device, and so on. The processor and transceiver may also be manufactured using various IC process technologies, such as Complementary Metal Oxide Semiconductor (CMOS), nMetal-Oxide-Semiconductor (NMOS), Positive Channel Metal Oxide Semiconductor (PMOS), Bipolar Junction Transistor (BJT), bipolar CMOS (BiCMOS), silicon germanium (SiGe), gallium arsenide (GaAs), etc.

The communication apparatus described in the above embodiments may be a first core network device, a second core network device or a multi-card terminal device, but the scope of the communication apparatus described in the present disclosure is not limited thereto. And, the structure of the communication apparatus is not limited by FIG. 7. The communication apparatus may be a stand-alone device or may be part of a larger device. For example, the communication apparatus may be:

(1) an independent integrated circuit (IC), or a chip, or a chip system or sub system;

(2) a collection of one or more ICs; optionally, the IC collection may further include a storage component configured to store data and computer programs;

(3) ASIC, such as modem;

(4) a module that can be embedded in other device(s);

(5) a receiver, a terminal device, an intelligent terminal device, a cellular phone, a wireless device, a handheld device, a mobile unit, a vehicle-mounted device, a network device, a cloud device, an artificial intelligence device, etc.;

(6) others, etc.

Those skilled in the art can also understand that the various illustrative logical blocks and steps listed in the embodiments of the present disclosure may be implemented by electronic hardware, computer software, or a combination of both. Whether such functionality is implemented in hardware or software depends on the specific application and overall system design requirements. Those skilled in the art can use various methods to implement the described functions for each specific application, but such implementation should not be understood as beyond the scope of protection of the embodiments of the present disclosure.

An embodiment of the present disclosure also provides a communication system. The system includes a paging processing apparatus as a multi-card terminal device, a paging processing apparatus as a first core network device, and a paging processing apparatus as a second core network device, as shown in the embodiment of FIG. 6. Or, the system may include a communication apparatus as a multi-card terminal device, a communication apparatus as a first core network device, and a communication apparatus as a second core network device, as shown in the embodiment of FIG. 7.

The present disclosure also provides a non-transitory computer-readable storage medium on which instructions are stored, and when the instructions are executed by a computer, the functions of any of the above method embodiments are implemented.

The present disclosure also provides a computer program product, which, when executed by a computer, implements the functions of any of the above method embodiments. In the technical solution, when the second subscriber identity card in the idle state receives the paging message sent from the second network device, the first subscriber identity card in the connected state sends the first busy indication information to the first core network device. The first busy indication information indicates that the multi-card terminal device has received the paging message of the second network device and decided not to respond temporarily. In this way, the multi-card terminal device can notify the second network device of the busy indication information of the second subscriber identity card in the idle state under the premise of not affecting the communication connection of the first subscriber identity card in the connected state. Accordingly, while the communication connection of the first subscriber identity card is kept uninterrupted, the solution can avoid a situation where the second network device continues to page the terminal all the time because the second network device does not receive a response from the multi-card terminal device. This technical solution can avoid wastes of signaling resources, and avoid erroneous statistics or operations of the second network device.

In an implementation, when the first subscriber identity card sends the first busy indication information to the first core network device, the method further includes:

sending, by the first subscriber identity card, information of the second subscriber identity card to the first core network device; and/or, sending, by the first subscriber identity card, information of the second network device to the first core network device; and/or, sending, by the first subscriber identity card, information of a second core network device to the first core network device; and/or, sending to the first core network device, by the first subscriber identity card, a cause why the second subscriber identity card does not respond to paging of the second network device; and/or, sending, by the first subscriber identity card, a busy duration of the second subscriber identity card to the first core network device.

In this technical solution, while the first subscriber identity card sends the first busy indication information to the first core network device, the first subscriber identity card may also send to the first core network device at least one of: information of the second subscriber identity card, information of the second network device, information of a second core network device, a cause why paging of the second network device is not responded, and/or a busy duration, so as to inform the second core network device of the current situation of the second subscriber identity card through the first core network device. In this way, the second core network device can decide to suspend operations, for example, suspend paging to the second sub scriber identity card.

In an implementation, sending, by the first subscriber identity card in the connected state in the multi-card terminal device, the first busy indication information to the first core network device includes:

determining whether it is needed to respond to the paging message of the second network device according to a preset criterion;

in response to that the multi-card terminal device decides not to respond to the paging message of the second network device, sending, by the second subscriber identity card, second busy indication information to the first subscriber identity card, where the second busy indication information is used to indicate that the second subscriber identity card has received the paging message of the second network device and decided not to respond temporarily; and after receiving the second busy indication information, sending, by the first subscriber identity card, the first busy indication information to the first core network device.

In the technical solution, when receiving the paging message of the second network device, whether it is needed to respond to the paging message of the second network device may be determined according to a preset criterion. If the paging message is responded to, it is not needed for the first subscriber identity card to send the first busy indication information to the first core network device, but the first subscriber identity card enters the idle state, and the second subscriber identity card enters the connected state, so that the second subscriber identity card communicates and is connected with the second network device, thereby realizing a service of the second network device. If it is determined not to respond to the paging message of the second network device, the first subscriber identity card notifies the second network device of the busy indication information of the second subscriber identity card.

In an optional implementation, determining whether it is needed to respond to the paging message of the second network device according to the preset criterion includes:

determining whether it is needed to respond to the paging message of the second network device according to a different service priority; or, determining whether it is needed to respond to the paging message of the second network device according to a quality of service configuration of a network system corresponding to the first subscriber identity card.

In the technical solution, whether it is needed to respond to the paging message of the second network device can be determined based on different service priorities, or whether it is needed to respond to the paging message of the second network device can be determined based on a quality of service configuration of a network system corresponding to the first subscriber identity card, so that the terminal device can determine whether it is needed to respond to the paging message of the second network device according to actual situation.

In an optional implementation, the preset criterion is configured by a network device through Non-Access Stratum (NAS) signaling or Radio Resource Control (RRC) signaling; or, the preset criterion is configured by the multi-card terminal device.

In an optional implementation, when the second subscriber identity card sends the second busy indication information to the first subscriber identity card, the methods further includes:

sending, by the second subscriber identity card, information of the second subscriber identity card to the first subscriber identity card; and/or, sending, by the second subscriber identity card, information of the second network device to the first subscriber identity card; and/or, sending, by the second subscriber identity card, information of a second core network device to the first subscriber identity card; and/or, sending to the first subscriber identity card, by the second subscriber identity card, a cause why the second subscriber identity card does not respond to paging of the second network device; and/or, sending, by the second subscriber identity card, a busy duration of the second subscriber identity card to the first subscriber identity card.

In an implementation, the first core network device and the second core network device are a same core network device.

In another implementation, the first core network device and the second core network device are different core network devices; the first core network device sends the first busy indication information, which is sent from the first subscriber identity card, to the second core network device.

In an optional implementation, the first subscriber identity card sends the first busy indication information through NAS signaling.

In the technical solution, the multi-card terminal device can notify the second network device of the busy indication information of the second subscriber identity card in the idle state under the premise of not affecting the communication connection of the first subscriber identity card in the connected state. While the communication connection of the first subscriber identity card is kept uninterrupted, the second network device can be prevented from paging the multi-card terminal device all the time because it has not received a response from the multi-card terminal device, thereby avoiding waste of signaling resources and avoiding erroneous statistics or operations of the second network device.

In an implementation, when receiving the first busy indication information sent from the first subscriber identity card, the method further includes:

receiving information of the second subscriber identity card sent from the first sub scriber identity card; and/or, receiving information of the second network device sent from the first sub scriber identity card; and/or, receiving information of a second core network device sent from the first sub scriber identity card; and/or, receiving a cause why paging of the second network device is not responded sent from the first subscriber identity card; and/or, a busy duration of the second subscriber identity card sent from the first subscriber identity card.

In an implementation, the first core network device and the second core network device are a same core network device.

In a possible implementation, after receiving the first busy indication information sent from the first subscriber identity card, the method further includes:

notifying, through an interface between a core network device and a network device, the second network device to suspend paging to the second subscriber identity card; or, suspending paging to the second subscriber identity card; or, suspending paging to the second subscriber identity card based on the first busy indication information.

In another implementation, the first core network device and the second core network device are different core network devices.

In a possible implementation, the method further includes:

sending the first busy indication information, which is sent from the first subscriber identity card, to the second core network device.

In an implementation, the structure of the paging processing apparatus may include a transceiving module and a processing module. The processing module is configured to support the paging processing apparatus to perform corresponding functions in the above methods. The transceiving module is configured to support communication(s) between the paging processing apparatus and other device(s). The paging processing apparatus may further include a storage module. The storage module is configure to couple with the transceiving module and the processing module, and stores necessary computer programs and data for the paging processing apparatus.

As an example, the processing module may be a processor, the transceiving module may be a transceiver or a communication interface, and the storage module may be a memory.

The above embodiments may be implemented in whole or in part by software, hardware, firmware, or any combination thereof. When implemented in software, the embodiments may be implemented in whole or in part in the form of a computer program product. The computer program product includes one or more computer programs. When the computer program is loaded and executed on a computer, processes or functions described in accordance with the embodiments of the present disclosure are generated in whole or in part. The computer may be a general-purpose computer, a special-purpose computer, a computer network, or other programmable device. The computer program may be stored in a computer-readable storage medium, or may be transferred from one non-transitory computer-readable storage medium to another, for example, the computer program may be transferred from a website, computer, server, or data center to another website, computer, server or data center through wired (such as coaxial cable, optical fiber, DSL (Digital Subscriber Line)) or wireless (such as infrared, wireless, microwave, etc.) means. The non-transitory computer-readable storage medium may be any available medium that can be accessed by a computer or a data storage device such as a server, data center, etc. that contains one or more available media integrated. The available medium may be magnetic medium (for example, floppy disk, hard disk, magnetic tape), optical medium (for example, high-density DVD (Digital Video Disc)), or semiconductor medium (for example, SSD (Solid State Disk)), etc.

Those of ordinary skill in the art can understand that first, second, and other numerical numbers involved in the present disclosure are only for convenience of description and are not used to limit the scope of the embodiments of the disclosure, nor to indicate a sequential order.

The term "at least one" in the present disclosure can also be described as one or more, and the plurality can be two, three, four or more, and the present disclosure is not limited thereto. In the embodiments of the present disclosure, for a kind of technical features, "first", "second", "third", "A", "B", "C" and "D", etc. are used to distinguish technical features in the kind of technical features, and technical features described associated with "first", "second", "third", "A", "B", "C" and "D" are in no particular sequential order or order of size.

The corresponding relationships shown in each table in the present disclosure can be configured or predefined. Value(s) of information in each table is(are) only examples and can be configured as other values, which is not limited by the present disclosure. When configuring a corresponding relationship between information and each parameter, it is not necessarily required to configure all the corresponding relationships shown in each table. For example, in a table in the present disclosure, a corresponding relationship shown in some rows may not be configured. For another example, appropriate modified adjustments can be made based on the above table, such as splitting, merging, etc. Names of parameters shown in titles of the tables may also be other names understandable by a communication apparatus, and values or expressions of parameters may also be other values or expressions understandable by the communication apparatus. When implementing the tables, other data structures can also be used, such as arrays, queues, containers, stacks, linear lists, pointers, linked lists, trees, graphs, structure bodies, classes, heaps, hash tables or lists, and so on.

Predefinition in the present disclosure may be understood as definition, definition in advance, storage, pre-storage, pre-negotiation, pre-configuration, solidification, or pre-burning.

Those of ordinary skill in the art will appreciate that the units and algorithm steps of each example described in conjunction with the embodiments disclosed herein can be implemented with electronic hardware, or a combination of computer software and electronic hardware. Whether these functions are performed in hardware or software depends on the specific application and design constraints of the technical solutions. Skilled artisans may implement the described functions using different methods for each specific application, but such implementations should not be considered to be beyond the scope of the present disclosure.

Those skilled in the art can clearly understand that for the convenience and simplicity of description, the specific working processes of the systems, devices and units described above can be referred to the corresponding processes in the foregoing method embodiments, and will not be described again here.

The above are only example embodiments of the present disclosure, but the protection scope of the present disclosure is not limited thereto. Any person familiar with the technical field can easily think of changes or substitutions within the technical scope disclosed in the present disclosure, and such changes or substitutions fall within the protection scope of the present disclosure. Therefore, the protection scope of the present disclosure should be determined by the appended claims.

What is claimed is:

1. A paging processing method, applied to a multi-card terminal device, and the method comprising:

sending, by a first subscriber identity card in a connected state with a first network device in the multi-card terminal device, first busy indication information to a first core network device, in response to determining that a second subscriber identity card in an idle state in the multi-card terminal device receives a paging message sent from a second network device;

wherein the first busy indication information is configured to indicate that the multi-card terminal device has received the paging message of the second network device and decided not to respond temporarily.

2. The paging processing method according to claim 1, wherein in response to determining that the first subscriber identity card sends the first busy indication information to the first core network device, the method further comprises at least one of following:

sending, by the first subscriber identity card, information of the second subscriber identity card to the first core network device;

sending, by the first subscriber identity card, information of the second network device to the first core network device;

sending, by the first subscriber identity card, information of a second core network device to the first core network device;

sending to the first core network device, by the first subscriber identity card, a cause why the second subscriber identity card does not respond to paging of the second network device; and sending, by the first subscriber identity card, a busy duration of the second subscriber identity card to the first core network device.

3. The paging processing method according to claim 1, wherein sending, by the first subscriber identity card in the connected state with the first network device in the multi-card terminal device, the first busy indication information to the first core network device comprises:

determining whether to respond to the paging message of the second network device according to a preset criterion;

in response to determining not to respond to the paging message of the second network device, sending, by the second subscriber identity card, second busy indication information to the first subscriber identity card, wherein the second busy indication information is configured to indicate that the second subscriber identity card has received the paging message of the second network device and decided not to respond temporarily; and after receiving the second busy indication information, sending, by the first subscriber identity card, the first busy indication information to the first core network device.

4. The paging processing method according to claim 3, wherein determining whether to respond to the paging message of the second network device according to the preset criterion comprises:

determining whether to respond to the paging message of the second network device according to a different service priority; or determining whether to respond to the paging message of the second network device according to a quality of service configuration of a network system corresponding to the first subscriber identity card.

5. The paging processing method according to claim 3, wherein:

the preset criterion is configured by a network device through Non-Access Stratum (NAS) signaling or Radio Resource Control (RRC) signaling; or the preset criterion is configured by the multi-card terminal device.

6. The paging processing method according to claim 3, wherein in response to determining that the second subscriber identity card sends the second busy indication information to the first subscriber identity card, the method further comprises at least one of following:

sending, by the second subscriber identity card, information of the second subscriber identity card to the first subscriber identity card;

sending, by the second subscriber identity card, information of the second network device to the first subscriber identity card;

sending, by the second subscriber identity card, information of a second core network device to the first subscriber identity card;

sending to the first subscriber identity card, by the second subscriber identity card, a cause why the second subscriber identity card does not respond to paging of the second network device; and sending, by the second subscriber identity card, a busy duration of the second subscriber identity card to the first subscriber identity card.

7. The paging processing method according to claim 2, wherein the first core network device and the second core network device are a same core network device.

8. The paging processing method according to claim 2, wherein the first core network device and the second core network device are different core network devices, wherein the first core network device sends the first busy indication information received from the first subscriber identity card, to the second core network device.

9. The paging processing method according to claim 1, wherein the first subscriber identity card sends the first busy indication information through Non-Access Stratum (NAS) signaling.

10. A paging processing method, applied to a first core network device and the method comprising:

receiving first busy indication information sent from a first subscriber identity card in a connected state with a first network device in a multi-card terminal device;

wherein the first busy indication information is configured to indicate that the multi-card terminal device has received a paging message of a second network device and decided not to respond temporarily, wherein the second network device is a network device corresponding to a second subscriber identity card in an idle state in the multi-card terminal device.

11. The paging processing method according to claim 10, wherein in response to receiving the first busy indication information sent from the first subscriber identity card, the method further comprises at least one of following:

receiving information of the second subscriber identity card sent from the first subscriber identity card;

receiving information of the second network device sent from the first subscriber identity card;

receiving information of a second core network device sent from the first subscriber identity card;

receiving a cause why paging of the second network device is not responded sent from the first subscriber identity card; and receiving a busy duration of the second subscriber identity card sent from the first subscriber identity card.

12. The paging processing method according to claim 11, wherein the first core network device and the second core network device are a same core network device.

13. The paging processing method according to claim 12, wherein after receiving the first busy indication information sent from the first subscriber identity card, the method further comprises:

notifying, through an interface between a core network device and a network device, the second network device to suspend paging to the second subscriber identity card;

suspending paging to the second subscriber identity card; or suspending paging to the second subscriber identity card based on the first busy indication information.

14. The paging processing method according to claim 11, wherein the first core network device and the second core network device are different core network devices.

15. The paging processing method according to claim 14, further comprising:

sending the first busy indication information received from the first subscriber identity card, to the second core network device.

16. A paging processing method, applied to a second core network device and the method comprising:

receiving first busy indication information sent from a first core network device, wherein the first busy indication information is received by the first core network device and sent from a first subscriber identity card in a connected state with a first network device in a multi-card terminal device;

wherein the first busy indication information is configured to indicate that the multi-card terminal device has received a paging message of a second network device and decided not to respond temporarily, and the second network device is a network device corresponding to a second subscriber identity card in an idle state in the multi-card terminal device.

17. The paging processing method according to claim 16, wherein after receiving the first busy indication information sent from the first core network device, the method further comprises:

notifying, through an interface between a core network device and a network device, the second network device to suspend paging to the second subscriber identity card;

suspending paging to the second subscriber identity card; or suspending paging to the second subscriber identity card based on the first busy indication information.

18. A multi-card terminal device comprising a processor and a memory, wherein a computer program is stored in the memory, and the processor executes the computer program stored in the memory to cause a communication apparatus to perform the method according to claim 1.

19. A first core network device comprising a processor and a memory, wherein a computer program is stored in the memory, and the processor executes the computer program stored in the memory to cause a communication apparatus perform the method according to claim 10.

20. A non-transitory computer-readable storage medium configured to store instructions, wherein when the instructions are executed, the method according to claim 1 is implemented.

* * * * *